(12) United States Patent
Adams et al.

(10) Patent No.: US 8,515,727 B2
(45) Date of Patent: Aug. 20, 2013

(54) AUTOMATIC LOGIC MODEL BUILD PROCESS WITH AUTONOMOUS QUALITY CHECKING

(75) Inventors: Matthew A. Adams, Poughkeepsie, NY (US); Khary J. Alexander, Poughkeepsie, NY (US); Matthew G. Pardini, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/051,288

(22) Filed: Mar. 19, 2008

(65) Prior Publication Data

US 2009/0240483 A1   Sep. 24, 2009

(51) Int. Cl.
*G06F 9/45* (2006.01)
*G06F 9/44* (2006.01)

(52) U.S. Cl.
USPC ...... 703/22; 703/1; 703/6; 717/104; 717/120; 717/124; 717/135; 717/168

(58) Field of Classification Search
USPC .............. 703/14, 15, 1, 6, 22; 715/230, 234, 715/511; 717/168–178, 104, 120, 124, 135
See application file for complete search history.

(56) References Cited

U.S. PATENT DOCUMENTS

| | | | | |
|---|---|---|---|---|
| 4,951,192 A * | 8/1990 | Chase et al. | | 717/149 |
| 5,950,209 A * | 9/1999 | Carrier et al. | | 1/1 |
| 5,960,196 A * | 9/1999 | Carrier et al. | | 717/122 |
| 6,029,175 A * | 2/2000 | Chow et al. | | 1/1 |
| 6,195,795 B1 * | 2/2001 | Block et al. | | 717/101 |
| 6,327,685 B1 | 12/2001 | Koprowski et al. | | |
| 6,353,806 B1 | 3/2002 | Gehlot | | |
| 6,490,545 B1 | 12/2002 | Peng | | |
| 6,510,466 B1 * | 1/2003 | Cox et al. | | 709/229 |
| 6,658,659 B2 * | 12/2003 | Hiller et al. | | 717/170 |
| 6,662,363 B1 * | 12/2003 | Miyamoto | | 717/174 |
| 7,107,201 B2 * | 9/2006 | Wheeler et al. | | 703/15 |
| 7,181,355 B2 * | 2/2007 | Kondo et al. | | 702/84 |
| 7,207,027 B2 * | 4/2007 | Bohm et al. | | 716/102 |
| 7,219,102 B2 * | 5/2007 | Zhou et al. | | 707/792 |
| 7,228,407 B2 * | 6/2007 | D'Alo et al. | | 713/1 |

(Continued)

FOREIGN PATENT DOCUMENTS

WO   0167208 A1   9/2001

OTHER PUBLICATIONS

B. Beaver, Categorizing Defects by Eliminating "Severity" and "Priority" pp. 1-3, 2007.*

(Continued)

*Primary Examiner* — Saif Alhija
*Assistant Examiner* — Kibrom Gebresilassie
(74) *Attorney, Agent, or Firm* — Cantor Colburn LLP; John Campbell

(57) ABSTRACT

A computer program product stored including machine executable instructions stored on machine readable media, the instructions configured for performing automatic logic build processes and implementing autonomic quality checking, by implementing a method including: providing a model repository for holding at least one component; updating the model repository with at least one component; creating a tag for each sub-component of a selected component of the model repository; associating each tag with a latest version of each respective sub-component; and issuing a component submit notice to identify at least one of a dependency and a priority between selected components. A system is also provided.

13 Claims, 6 Drawing Sheets

(56) References Cited

U.S. PATENT DOCUMENTS

| | | | |
|---|---|---|---|
| 7,322,025 B2* | 1/2008 | Reddy et al. | 717/121 |
| 7,788,239 B2* | 8/2010 | Scholl et al. | 707/695 |
| 7,873,944 B2* | 1/2011 | Bangel et al. | 717/124 |
| 7,886,041 B2* | 2/2011 | Outhred et al. | 709/224 |
| 7,890,919 B1* | 2/2011 | Williams | 717/100 |
| 7,917,888 B2* | 3/2011 | Chong et al. | 717/102 |
| 8,024,303 B2* | 9/2011 | Roehrle et al. | 707/694 |
| 8,074,119 B1* | 12/2011 | Rao et al. | 714/48 |
| 8,126,768 B2* | 2/2012 | Mehrotra et al. | 705/7.36 |
| 2003/0005037 A1* | 1/2003 | Aija et al. | 709/203 |
| 2004/0019888 A1* | 1/2004 | Jain et al. | 717/176 |
| 2004/0044997 A1* | 3/2004 | Talati et al. | 717/170 |
| 2004/0199899 A1* | 10/2004 | Powers et al. | 717/120 |
| 2004/0205727 A1* | 10/2004 | Sit et al. | 717/125 |
| 2004/0254962 A1* | 12/2004 | Kodama et al. | 707/201 |
| 2004/0261053 A1 | 12/2004 | Dougherty et al. | |
| 2005/0066271 A1* | 3/2005 | Uchiyama et al. | 715/513 |
| 2005/0114829 A1* | 5/2005 | Robin et al. | 717/101 |
| 2005/0198565 A1* | 9/2005 | McChrystal | 715/511 |
| 2005/0223361 A1* | 10/2005 | Belbute | 717/124 |
| 2005/0229159 A1* | 10/2005 | Haba et al. | 717/122 |
| 2005/0246387 A1* | 11/2005 | McChrystal | 707/200 |
| 2006/0041864 A1* | 2/2006 | Holloway et al. | 717/124 |
| 2006/0047487 A1 | 3/2006 | Volponi et al. | |
| 2006/0069961 A1* | 3/2006 | Kalyanaraman | 714/38 |
| 2007/0027934 A1* | 2/2007 | Roehrle et al. | 707/203 |
| 2007/0033443 A1* | 2/2007 | Tillmann et al. | 714/45 |
| 2007/0150879 A1* | 6/2007 | Rangarajan et al. | 717/154 |
| 2007/0240154 A1* | 10/2007 | Gerzymisch et al. | 717/174 |
| 2007/0250810 A1* | 10/2007 | Tittizer et al. | 717/110 |
| 2008/0046484 A1* | 2/2008 | Ellis et al. | 707/204 |
| 2008/0103622 A1* | 5/2008 | Hanses et al. | 700/116 |
| 2008/0155505 A1* | 6/2008 | Lin et al. | 717/124 |
| 2008/0244585 A1* | 10/2008 | Candea et al. | 718/102 |
| 2008/0277466 A1* | 11/2008 | Dohm et al. | 235/382 |
| 2008/0288530 A1* | 11/2008 | Flam et al. | 707/102 |
| 2009/0055818 A1* | 2/2009 | Cheng et al. | 717/173 |
| 2009/0070755 A1* | 3/2009 | Taylor et al. | 717/168 |
| 2009/0113397 A1* | 4/2009 | Wright, Sr. | 717/127 |
| 2009/0177910 A1* | 7/2009 | Liu et al. | 714/2 |
| 2010/0083230 A1* | 4/2010 | Ramakrishnan et al. | 717/121 |
| 2010/0083243 A1* | 4/2010 | Mincarelli et al. | 717/173 |
| 2010/0083246 A1* | 4/2010 | Mincarelli et al. | 717/178 |
| 2010/0325616 A1* | 12/2010 | Singonahalli et al. | 717/135 |
| 2011/0218979 A1* | 9/2011 | Martin et al. | 707/695 |

OTHER PUBLICATIONS

B. Beaver, Categorizing Defects by Eliminating "Severity" and "Priority" 2007, pp. 1-3.*

Lallier, et al. "Relating Logic Design to Physical Geometry in LSI Chip". IBM Technical Disclosure Bulletin. Nov. 1976. pp. 2140-2143.

z/Architecture. "Principles of Operation". Sixth Edition (Apr. 2007). IBM. 1218 pages.

* cited by examiner

120

AUTOMATIC LOGIC MODEL BUILD PROCESS WITH AUTONOMOUS QUALITY CHECKING

BACKGROUND OF THE INVENTION

This invention relates generally to testing systems for evaluation of circuit logic, and more particularly to providing a system that provides automatic building and testing of component updates in a software and hardware model.

Testing of prototype hardware and/or software is routinely performed. Efficient techniques for performing testing involve environments providing simulation. In the past, model build processes have experienced various build problems. For example, no formal method exists for expressing inter-component dependencies; failures in less critical components were slowing the adoption of critical components; components had no way of independently testing there quality at the model level before releasing; simple repetitive tasks were being done by engineers; inconsistent delivery of components from varied groups.

One example is provided in U.S. Pat. No. 6,490,545, entitled "Method and apparatus for adaptive co-verification of software and hardware designs." In this patent, a simulation system is provided for simulating behavior of a device for implementing an algorithm using a software model and a hardware model which are converted to a common programming language and mathematical notation. The simulation system uses the same input user interface for the software model and the hardware model. The simulation system uses the same output user interface for generating the simulation results for both the software model and the hardware model in the common programming language and mathematical notation, purportedly allowing a user to verify and analyze the software and hardware simulation results for optimization of the device. Unfortunately, this system calls for considerable interfacing, and is therefore not very efficient from the perspective of a user.

Another example of simulation is provided in U.S. Pat. No. 6,353,806, entitled "System level hardware simulator and its automation." This patent discloses an apparatus that provides for automatically generating symbolic models and developing a system level hardware simulator. The system to be simulated is subdivided into a plurality of system layers which are associated with symbolic model symbols. The specification of a symbolic model symbol represents a functionality of a system layer, a subset of the system hierarchy. Each symbolic model symbol reads from its allocated memory, gathers input from associated symbolic model symbols, updates its register contents and broadcasts updates to associated symbolic model symbols, as per its specification, completing a cycle of simulation when a complete chain of associated symbolic model symbols is updated. A displayed symbolic model can be interacted with to modify the model by altering the interconnections of the displayed symbolic model causing corresponding modification of the connections of other interconnected symbolic model symbols and their associated input/output memories. The simulator operates as a real time event simulator through further linkage of symbolic model symbols to timing information specifying real-time propagation and time delays. Unfortunately, this patent only describes a hardware simulator, and does not accommodate a combined hardware and software simulation environment.

Thus, what are needed are techniques for testing hardware and software, where the techniques overcome problems cited in the prior art. Preferably, the process will reduce the number of errors found in hardware model builds and release and make finding problem in the model build easier and quicker.

BRIEF SUMMARY OF THE INVENTION

An exemplary embodiment includes a computer program product stored including machine executable instructions stored on machine readable media, the instructions configured for performing automatic logic build processes and implementing autonomic quality checking, by implementing a method including: providing a model repository for holding at least one component; updating the model repository with at least one component; creating a tag for each sub-component of a selected component of the model repository; associating each tag with a latest version of each respective sub-component; and issuing a component submit notice to identify at least one of a dependency and a priority between selected components.

Another exemplary embodiment includes a system for performing automatic logic build processes and implementing autonomic quality checking, the system including: a processor for accessing machine readable media including machine executable instructions; the instructions configured for performing the automatic logic build processes and implementing autonomic quality checking, by implementing a method including: providing a model repository for holding at least one component; updating the model repository with at least one component; creating a tag for each sub-component of a selected component of the model repository; associating each tag with a latest version of each respective sub-component; and issuing a component submit notice to identify at least one of a dependency and a priority between selected components; an input for inputting the at least one component; and an output for providing a common model built from components.

Another exemplary embodiment includes a computer program product stored including machine executable instructions stored on machine readable media, the instructions configured for performing automatic logic build processes and implementing autonomic quality checking, by implementing a method including: providing a model repository for holding at least one component; updating the model repository with at least one component; creating a tag for each sub-component of a selected component of the model repository; associating each tag with a latest version of each respective sub-component; issuing a component submit notice including the tag to identify at least one of a dependency and a priority between selected components; testing dependency between components then building a component model from at least one of: a released common model, at least one sub-component associated with a latest component tag, and any component dependencies; providing each component a separate build environment; building a plurality of components speculatively and in parallel and automatically terminating a build for a failing component; sending an error detected during a model build process to at least one of a component submitter and model builder; performing a test to qualify a new component model and for each qualified component, releasing the component; updating a common model build environment with each qualified component; and outputting the common model.

BRIEF DESCRIPTION OF THE DRAWINGS

Referring now to the drawings wherein like elements are numbered alike in the several figures.

DETAILED DESCRIPTION OF EXEMPLARY EMBODIMENTS

Figure 1:
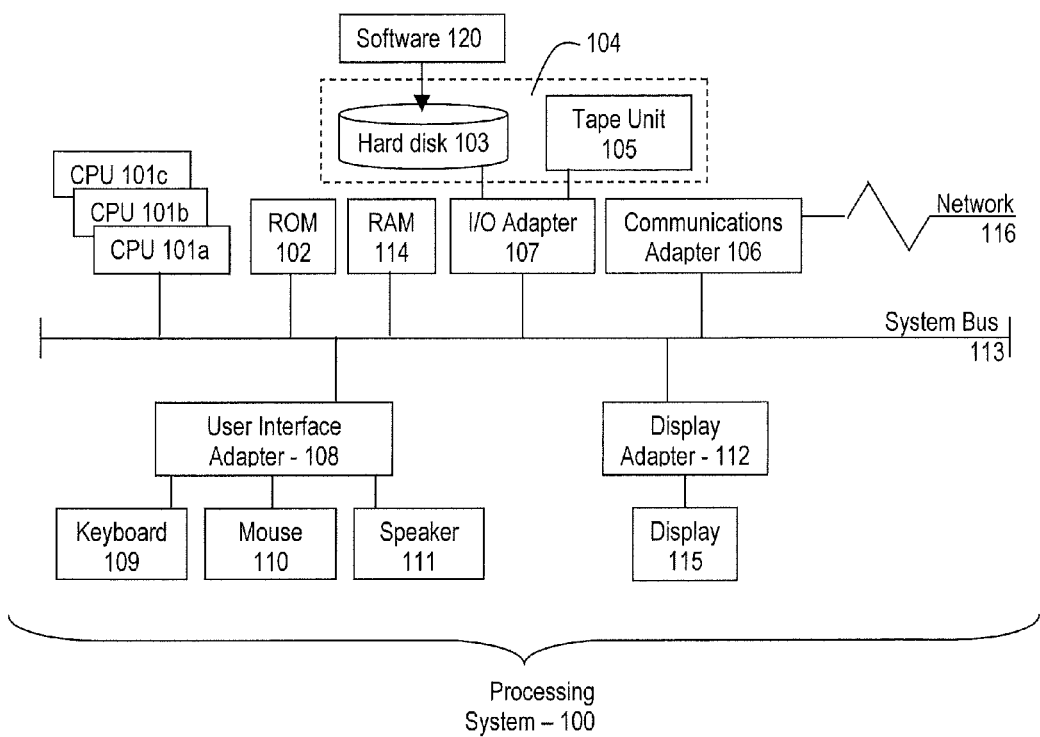
FIG. 1 illustrates one example of a processing system for practice of the teachings herein.
Figure 2:
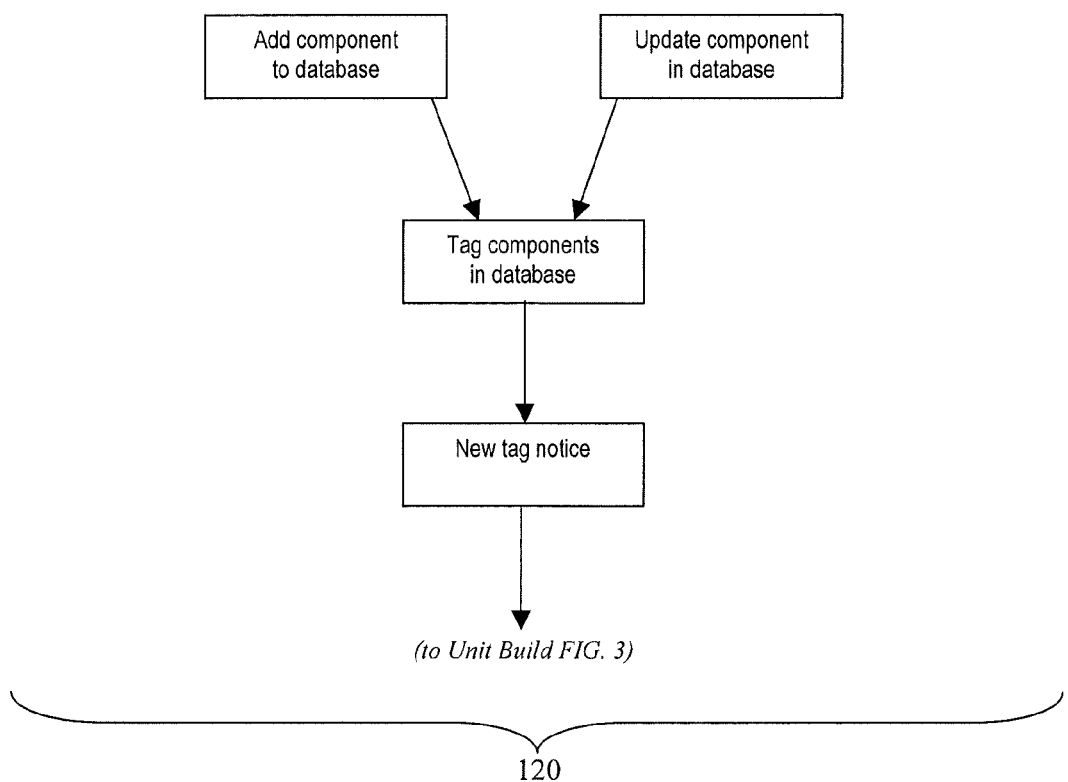
FIGS. 2-6 collectively provide exemplary logic for software as a flow chart.
Figure 3:
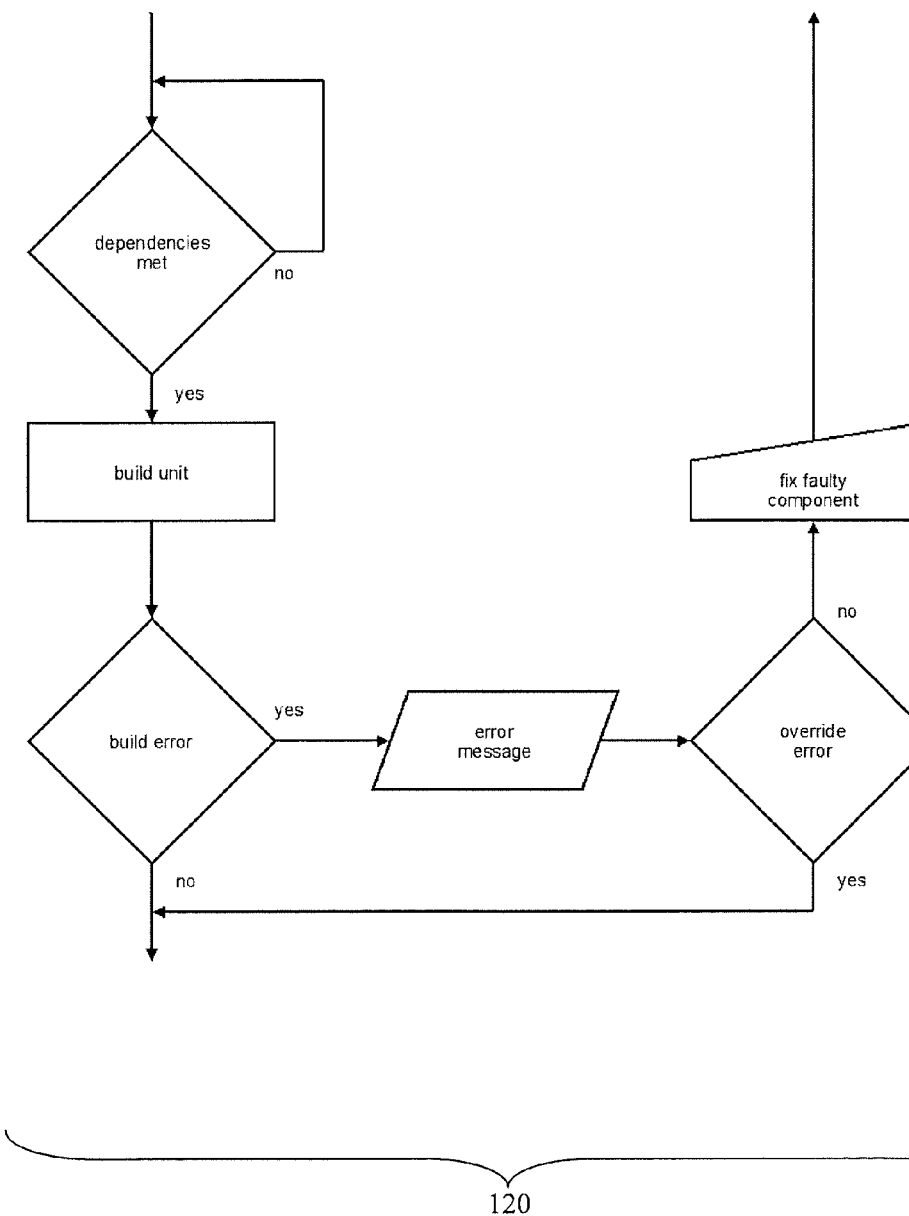
Figure 4:
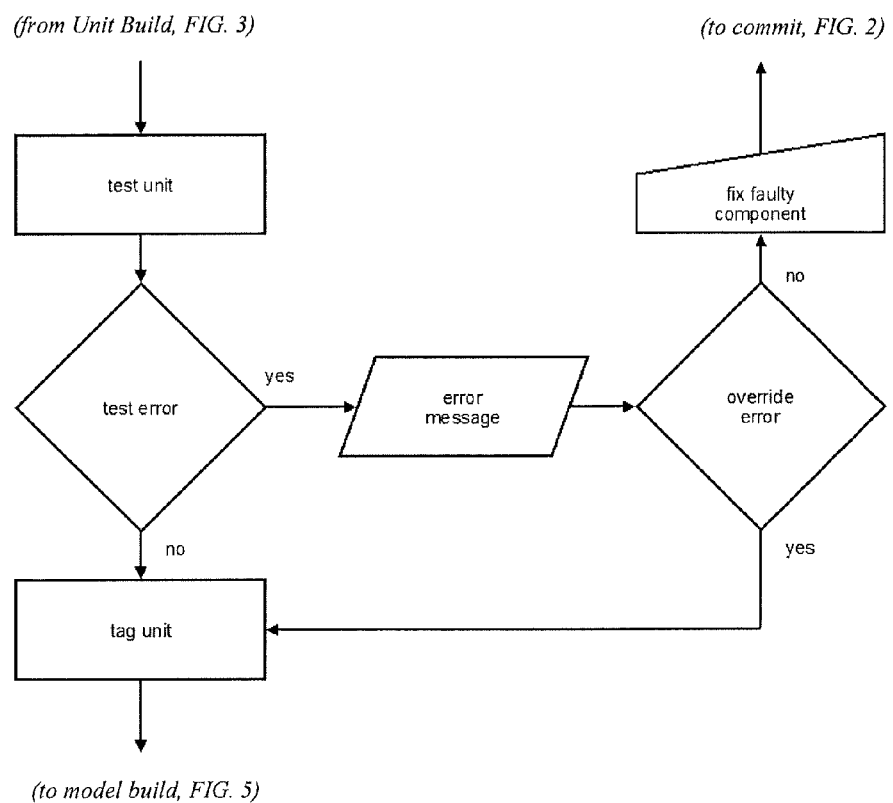
Figure 5:
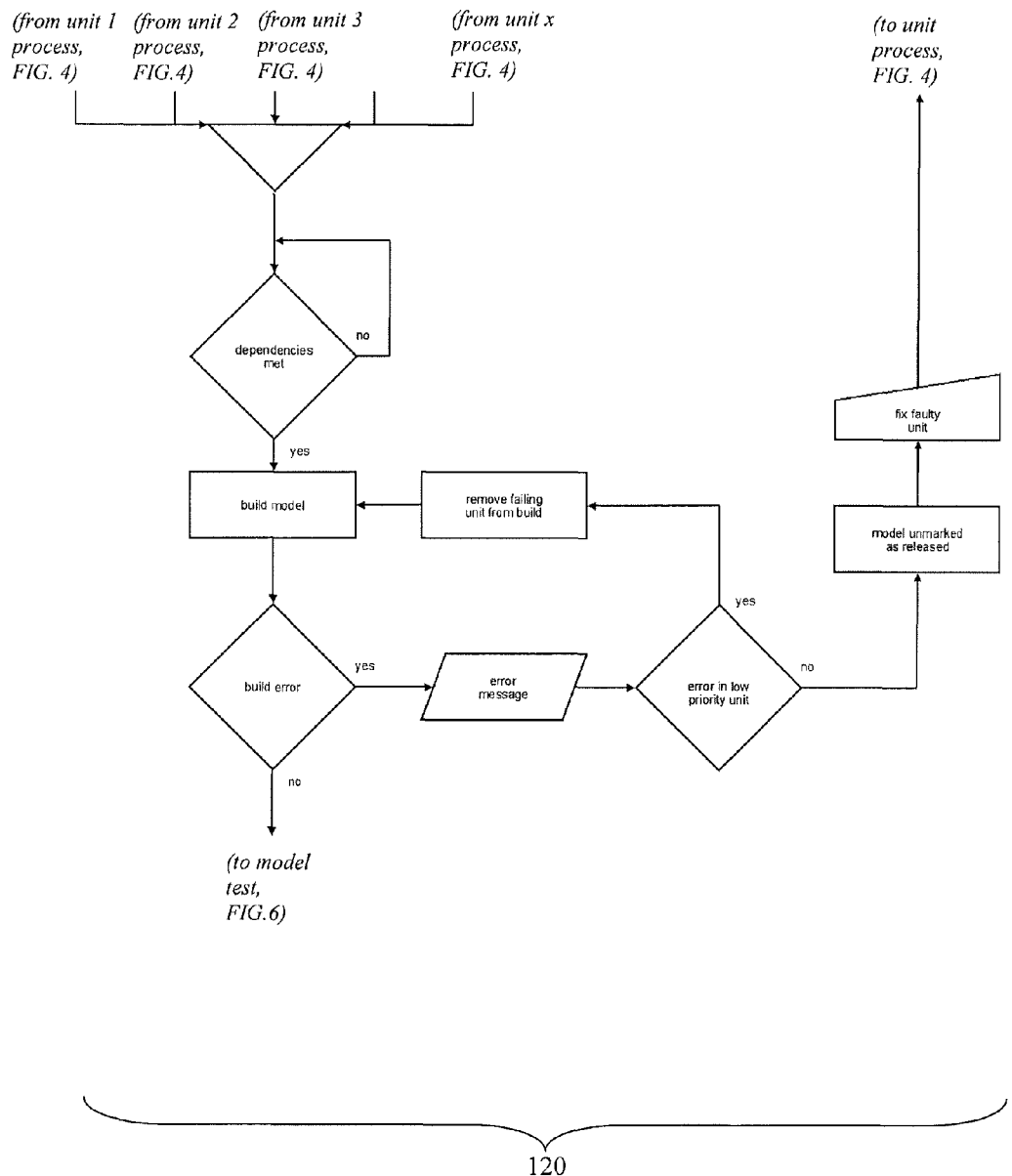
Figure 6:
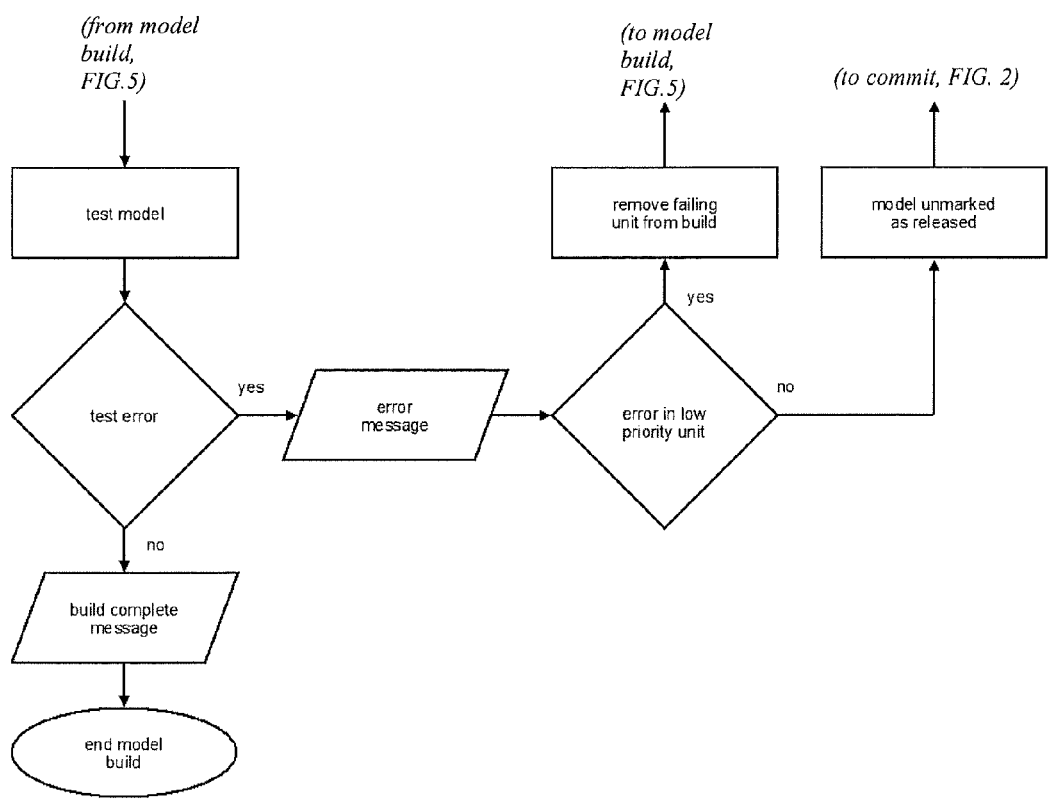

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor, in another embodiment at least one complex instruction set computer (CISC) microprocessor is used. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 116 for communicating over a network. The network can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine readable and executable instructions stored on machine readable media (for example, the hard disk 104) for performing automatic logic build processes and implementing autonomic quality checking. As discussed herein, the instructions are referred to as "software" 120. The software 120 may be produced using software development tools as are known in the art. Also discussed herein, the software 120 may also referred to as a "testing module" 120 or by other similar terms. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The software 120 generally provides users with a capability to thoroughly and automatically test a model build. The commands may be native to (written to function within) computer application code programs (for example, C, C++, Perl, Java and others), other programs typically regarded as computing environments (UNIX, LINUX, DOS, and others) as well as other types of programs.

As a matter of convention herein, it is considered that the software 120 provides for performing simulation and testing. The software 120 may generate, manipulate and otherwise handle components, models, simulations, builds of models and other such elements. In general, as discussed herein, the software 120 provides for automated testing and other features in relation to model builds.

Also by way of convention, models are used to provide for simulation of a hardware and/or software design. The models make use of components and may make use of sub-components, each of which incorporates other design elements (i.e., design logic). In general, a build of a model refers to a compilation of at least some of the components and/or sub-components necessary for execution of simulation (and therefore a testing of inter-element logic). Thus, the software 120 disclosed herein, which provides for performing automatic logic build processes and implementing autonomic quality checking, offers particular advantages in performing effective simulations (and troubleshooting of design elements).

One skilled in the art will recognize that the software 120 may work closely and interactively other computer code useful for performing simulations. Accordingly, aspects, features or functions of one of the software 120 or the computer code, as discussed herein, may be performed by the other (i.e., vice-versa), or by other resources within the system 100. Accordingly, the teachings herein are merely illustrative and are not limiting of the invention. As one example, the software 120 may include all of the foregoing aspects, features or functions of the computer code, essentially providing an integrated package.

Also, as used herein, the term "automated" generally refers to a capability of the software 120 to perform testing with minimal, limited or no intervention or supervision by a user.

In general, the software 120 provides a facility that automates model build, resulting in less time spent doing repetitive tasks. The software 120 also provides for parallel component builds, resulting in a decreased time to final build. Further, the software 120 prioritizes components resulting in quicker time to a working released model with required components. If errors are encountered in low priority components, a new model without the low priority components can be automatically rebuilt and released without have to wait for fixes. In addition, the software 120 automatically waits for dependencies between units to be resolved before attempting a build. Automatic waiting encourages communication between component teams and helps to prevent errors in the build process. Further, the build and test process is generally automatically performed in stages for each unit and again at the core level. Advancement to the next level of build or testing is automatic if no errors are encountered. If errors are encountered the build process can be restarted, stalled or the errors can be overridden.

Now with reference to FIGS. 2-6, in general, a method implemented by the software 120 provides for components to submit respective updates to the model while specifying its importance (priority) and a list of dependencies. Also, with regard to FIGS. 2-6, note that the flow chart provided is broken up for readability. In short, FIGS. 2-6 provide a single, exemplary flow chart with detailed logic for the software 120. Further, with regard to these figures, the term "unit" refers to one or more components that can be independently tested; the term "test model" refers to one or more units that are included within the whole model design; the term "commit" refers to the process of adding or updating an existing component to the repository; and, the term "database" makes reference to the repository.

In the software 120, the build environment automatically tests the new component against a released model after all of the dependencies are met. After passing tests against a released model, the new component is combined with other new tested components to form a new model. The build environment automatically tests the new model. If the combination of new components fail to work together, a new model is built without the failing components unless one of the failing components has a high priority. In that case, the model release is stalled until the component is fixed. When a model with working components tests without error it is automatically released.

More specifically, a model repository is created to hold one or more components. Sub-components may be at least one of added to and updated in the model repository. A component tag is created and associated with the latest version of all the sub-components that give rise to the component. In use, a component submit notice is sent that includes: a new component tag, a description of dependencies between components (unidirectional or co-dependencies), a priority (to later determine components authority to hold up a model release). After any dependencies are met, a component model is created from: a released common model, sub-components associated with the latest component tag and any component dependencies.

During a model build, each component is provided with its own model build environment allowing multiple components to build speculatively and in parallel. Any errors encountered during a component model build process are caught and sent to a component submitter and model builder. The failing component model's build is terminated unless the model builder overrides the fail. (Other parallel component model builds are not affected).

After a successful component model build, an incremental regression test is performed against the new component model. Any errors encountered during the test are caught and sent to the component submitter and model builder and the component model test process is terminated or suspended for that component until the model builder overrides the fail for that component. (Other parallel component model builds are not affected). If all tests run successfully the component is qualified as a released component.

If a common model is not currently being built, the sub-components that include a released component are used to update a common model build environment and a new common model is built.

Any errors encountered during the common model build process are caught. For example, if the common model is being built for a component with a low priority the component looses its released status. Alternatively, if the common model is being built for a component with a high priority the common model build process is suspended until that component has been re-released.

After a successful common model build an incremental regression test is performed against the new common model. Any errors encountered during the test are caught and sent to the component submitter and model builder. If the common model is being built for a component with a low priority the component looses its released status. If the common model is being built for a component with a high priority, the common model build process is suspended until that component has been re-released. If all tests run successfully the common model is kept to be later qualified as a released model. The decision to make a common model released can be automatic or await a model builder/releaser.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer program product for performing automatic logic build processes for building models for simulation of any one of hardware or software designs, the models comprising logic components and sub-components having design logic, the computer program product comprising:
a non-transitory tangible storage medium readable by a processing circuit and storing instructions for execution by the processing circuit for performing a method comprising:
creating a component tag for a component, the component tag comprising a priority level of the component;
selecting a version of a plurality of sub-components for inclusion in the component tag;
associating the component tag with the selected versions of the plurality of sub-components;
creating a new component model based on a common model and the sub-components associated with the component tag;
testing the new component model, the testing resulting in one of a successful completion or an unsuccessful completion;
qualifying the new component model as a released component based on the testing resulting in the successful completion;
updating the common model based on the qualifying of the new component model;
determining the priority level of new component model based on the testing resulting in the unsuccessful completion;
preventing the release of the common model based on the determining that the priority level of new component model is a predetermined high priority; and
updating the common model using a previous version of a component model and eliminating new component model from the common model based on the determining that the priority level of new component model is a predetermined low priority.

2. The computer program product of claim 1, wherein the method further comprises creating and testing an other component model in parallel with the creating and testing of the new component model, and the updating the common model is further based on results of the testing of the other component.

3. The computer program product of claim 2, wherein the testing the new component model comprises testing a dependency between the new component model and the other component model.

4. The computer program product of claim 1, wherein the testing comprises performing an incremental regression test against the new component model.

5. The computer program product of claim 1, wherein the method further comprises testing the common model based on the qualifying of the new component model.

6. A system for performing automatic logic build processes for building models for simulation of any one of hardware or software designs, the models comprising logic components and sub-components having design logic, the system comprising:
a processor and a memory, the processor configured to perform a method, the method comprising:
creating a component tag for a component, the component tag comprising a priority level of the component;
selecting a version of a plurality of sub-components for inclusion in the component tag;
associating the component tag with the selected versions of the plurality of sub-components;
creating a new component model based on a common model and the sub-components associated with the component tag;
testing the new component model, the testing resulting in one of a successful completion or an unsuccessful completion;
qualifying the new component model as a released component based on the testing resulting in the successful completion;
updating the common model based on the qualifying of the new component model;
determining the priority level of new component model based on the testing resulting in the unsuccessful completion;
preventing the release of the common model based on the determining that the priority level of new component model is a predetermined high priority; and
updating the common model using a previous version of a component model and eliminating new component model from the common model based on the determining that the priority level of new component model is a predetermined low priority.

7. The system of claim 6, wherein the method further comprises creating and testing another component model in parallel with the creating and testing of the new component model and the updating the common model is further based on results of the testing of the another component.

8. The system of claim 7, wherein the testing the new component model comprises testing a dependency between the new component model and the other component model.

9. The system of claim 6, wherein the testing comprises performing an incremental regression test against the new component model.

10. A method for performing automatic logic build processes for building models for simulation of any one of hardware or software designs, the models comprising logic components and sub-components having design logic, the method comprising: creating a component tag for a component, the component tag comprising a priority level of the component;
selecting, by a computer, a version of a plurality of sub-components for inclusion in the component tag;
associating the component tag with the selected versions of the plurality of sub-components;
creating a new component model based on a common model and to the sub-components associated with the component tag;
testing the new component model, the testing resulting in one of a successful completion or an unsuccessful completion;
qualifying the new component model as a released component based on the testing resulting in the successful completion;
updating the common model based on the qualifying of the new component model;
determining the priority level of new component model based on the testing resulting in the unsuccessful completion;
preventing the release of the common model based on the determining that the priority level of new component model is a predetermined high priority; and
updating the common model using a previous version of a component model and eliminating new component model from the common model based on the determining that the priority level of new component model is a predetermined low priority.

11. The method of claim 10, further comprising creating and testing another component model in parallel with the creating and testing of the new component model and the updating the common model is further based on results of the testing of the another component.

12. The method of claim 11, wherein the testing the new component model comprises testing a dependency between the new component model and the other component model.

13. The method of claim 10, wherein the testing comprises performing an incremental regression test against the new component model.

* * * * *